United States Patent [19]

Schwendeman et al.

[11] Patent Number: 5,404,569
[45] Date of Patent: * Apr. 4, 1995

[54] SATELLITE BASED ACKNOWLEDGE-BACK PAGING SYSTEM

[75] Inventors: Robert J. Schwendeman, Pompano Beach; William J. Kuznicki, Coral Springs, both of Fla.

[73] Assignee: Motorola, Inc., Schaumburg, Ill.

[*] Notice: The portion of the term of this patent subsequent to Aug. 24, 2010 has been disclaimed.

[21] Appl. No.: 160,315

[22] Filed: Dec. 2, 1993

Related U.S. Application Data

[63] Continuation of Ser. No. 77,257, Jun. 17, 1993, which is a continuation of Ser. No. 450,707, Dec. 14, 1989, abandoned.

[51] Int. Cl.$^6$ .................. H04B 7/185; H04Q 7/02
[52] U.S. Cl. .................. 455/13.4; 455/13.1; 455/33.1; 455/34.1; 455/56.1; 340/825.44
[58] Field of Search .............. 379/56, 57, 58, 59, 379/60, 63; 371/35; 370/93; 340/825.44, 825.47; 342/358, 353, 376; 455/12.1, 13.1, 13.2, 13.4, 33.1, 33.2, 33.4, 34.1, 34.2, 54.1, 54.2, 56.1, 53.1, 116, 126, 127

[56] References Cited

U.S. PATENT DOCUMENTS

| | | | |
|---|---|---|---|
| 3,497,807 | 2/1970 | Newton | 455/13.1 |
| 4,145,658 | 3/1979 | Acampora et al. | 455/12.1 |
| 4,178,476 | 12/1979 | Frost | 379/58 |
| 4,268,831 | 5/1981 | Valentino et al. | 342/376 |
| 4,672,655 | 6/1987 | Koch | 379/58 |
| 4,718,066 | 1/1988 | Rogard | 371/35 |
| 4,849,750 | 7/1989 | Andros et al. | 340/825.44 |
| 4,891,637 | 1/1990 | Siwiak et al. | 370/93 |
| 5,008,952 | 4/1991 | Davis et al. | 455/12.1 |
| 5,010,317 | 4/1991 | Schwendeman et al. | 455/13.2 |
| 5,239,670 | 8/1993 | Schwendeman et al. | 455/34.1 |

OTHER PUBLICATIONS

"An Integrated Satellite-Cellular Land Mobile System For Europe", Enrico Del Re.

Primary Examiner—Reinhard J. Eisenzopf
Assistant Examiner—Thanh C. Le
Attorney, Agent, or Firm—R. Louis Breeden

[57] ABSTRACT

A satellite based paging communication system includes at least one satellite that communicates paging information to at least one terrestrial receiver some of which transmit an acknowledge signal so that message reception may be verified and satellite traffic controlled.

19 Claims, 14 Drawing Sheets

SATELLITE BASED ACKNOWLEDGE-BACK PAGING SYSTEM

This is a continuation of application Ser. No. 08/077,257, filed Jun. 17, 1993, which application is a continuation of application Ser. No. 07/450,707, filed Dec. 14, 1989, now abandoned.

TECHNICAL FIELD

This invention relates generally to paging communication systems, and more specifically to wide geographic area paging systems, and is particularly directed toward a satellite based acknowledge-back (Ack-Back) paging communication system.

BACKGROUND

Historically, paging systems provided service to a limited geographic area using a relatively high-power centralized transmitting site. This arrangement worked well in small cities and municipalities, but often proved unsuitable for large metropolitan areas. To adequately serve a larger geographic area, paging systems began to simulcast (i.e., transmit the same message at substantially the same time) from several transmitters strategically positioned to provide wide-area coverage. In such a system, an individual having a selective call receiver (pager) could receive information anywhere in the metropolitan paging service area.

Today, the trend in paging communication is to provide even greater geographic coverage. Nationwide paging systems are often contemplated in an attempt to provide paging messages to customers without regard to where they are in the United States (for example). One known multi-city paging system employs satellites to transmit paging messages to ground repeaters in approximately eighty cities so that their customers can be paged while travelling in any of the covered cities. Regrettably, these contemporary satellite paging systems suffer from designed-in energy and paging traffic inefficiencies. That is, the system satellite link(s) often form a bottle-neck as regards delivering the paging messages. Also, these satellites are operated at full transmitter power, which is wasteful of energy, and degrades overall system efficiency. Accordingly, a need exists for a paging communication system that provides everyone with convenient, reliable and efficient paging service.

SUMMARY Of THE INVENTION

Briefly, according to the invention, a paging communication system comprises at least one satellite for communicating paging information with at least one terrestrial receiver (e.g., pager). The terrestrial receivers operate to acknowledge receipt of paging messages. By receiving (or not receiving) this acknowledge signal, the location of the terrestrial receiver can be determined, and the satellite's transmitter power can be controlled.

DESCRIPTION OF THE PREFERRED EMBODIMENT

Fundamentally, the present invention provides a world-wide communication system designed to call (page) individuals having a selective call receiver (pager). According to the invention, the selective call receiver (pager) disclosed herein may be operated within the system to control the satellite's transmitter power via the pager's acknowledge-back signal.

THE SYSTEM

Figure 1:
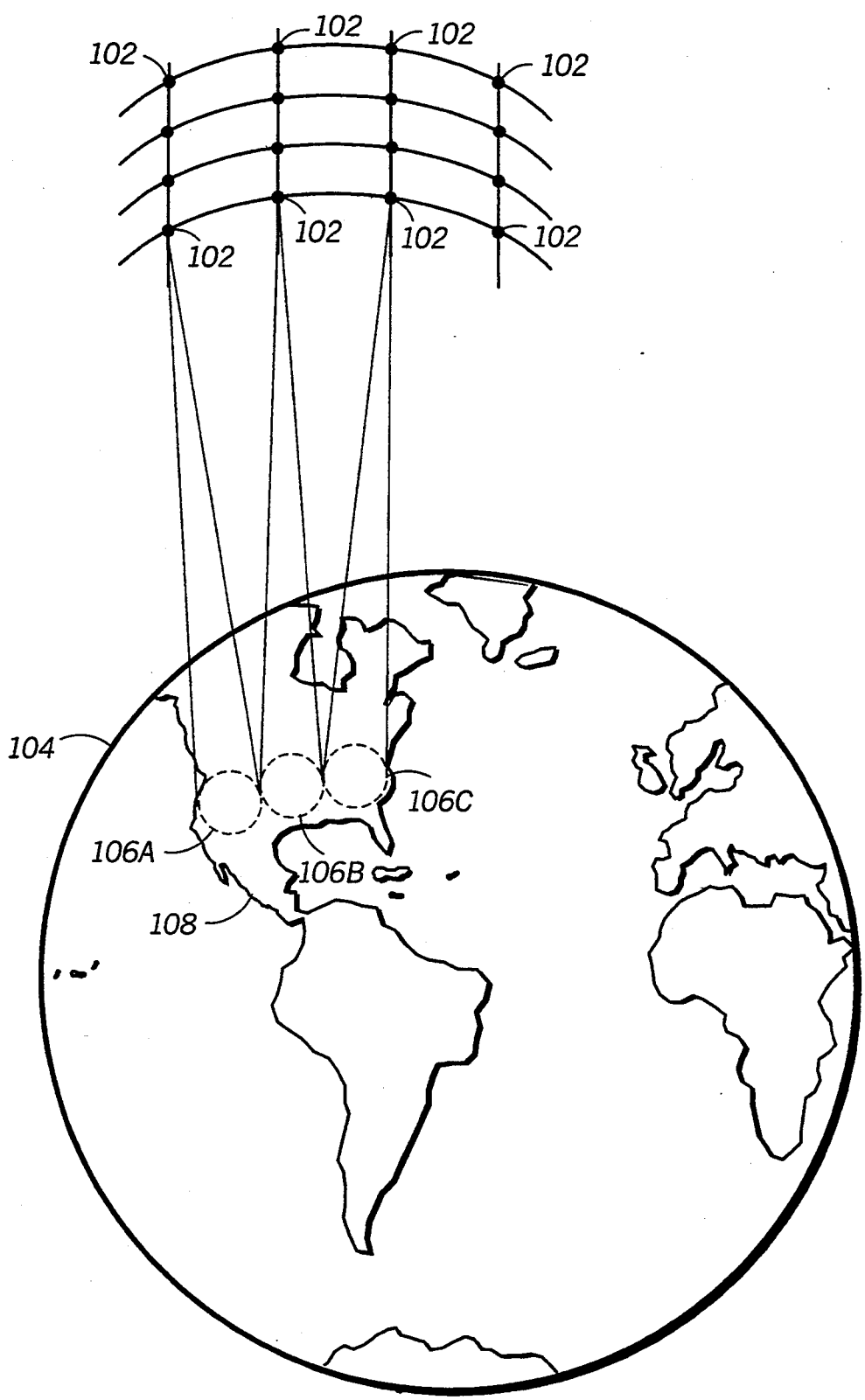
FIG. 1 is an illustration of an orbiting satellite network in accordance with the present invention.

Referring to FIG. 1, the inventive communication system of the present invention can be seen to be based on a network of satellites 102 disposed about a natural or artificial celestial body 104. Preferably, seventy-seven (77) satellites are deployed in various orbits about the celestial body (or planet) so as to be able to communicate a signal to a receiver (e.g., pager) anywhere on the planet. Of course, more or fewer satellites could be used depending on the transmission capabilities of the satellites and the desired communication coverage of the planet. According to the invention, the seventy-seven orbiting satellites are arranged in seven (7) orbit planes to form a satellite network so as to provide communication regardless of whether the receiver is operating on a land mass, on a body of water, or traveling by aircraft (provided that the aircraft is within the beam of the transmitting satellite).

Referring still to FIG. 1, three of the satellites are illustrated as communicating with a respective area 106a–106c of a land mass 108. Each area 106 is commonly referred to as the "footprint" of the transmitting beam of each satellite. According to the present invention, each satellite is capable of transmitting paging information either to paging receivers, or to ground stations located within the footprint of a particular satellite. Additionally, acknowledge-back signals from the pagers are received and processed by the satellites to control the transmit power of the satellites as will become hereinafter apparent. In the preferred embodiment, the transmission footprint of each satellite comprises thirty-seven (37) individual transmission lobes that allow the transmission power and footprint of each satellite to be controlled and fine tuned to deliver a paging message.

Within the satellite network, each satellite operates substantially independently of the others; although the entire network is coordinated by a centralized control facility. To provide a global paging system capable of accommodating the various operational protocols developed for paging receivers and systems, the present invention is capable of adapting a portion of itself for each paging event to the receiver (or receivers) designated to receive the paging information. That is, for example, paging receivers operating in area 106a may receive paging information directly from the satellite using Golay Sequential Coding (GSC). Simultaneously, paging receivers operating in area 106b can receive information from its satellite, or a terrestrial base station (or both), using the well known POCSAG protocol. Further, selective call receivers (pagers) operating in area 106c may comprise existing tone-only or tone-and-voice paging receivers that receive information relayed from the satellite through an existing contemporary paging system. Thus, the present invention adapts that portion of the system required to communicate with the pagers to be contacted.

Figure 2:
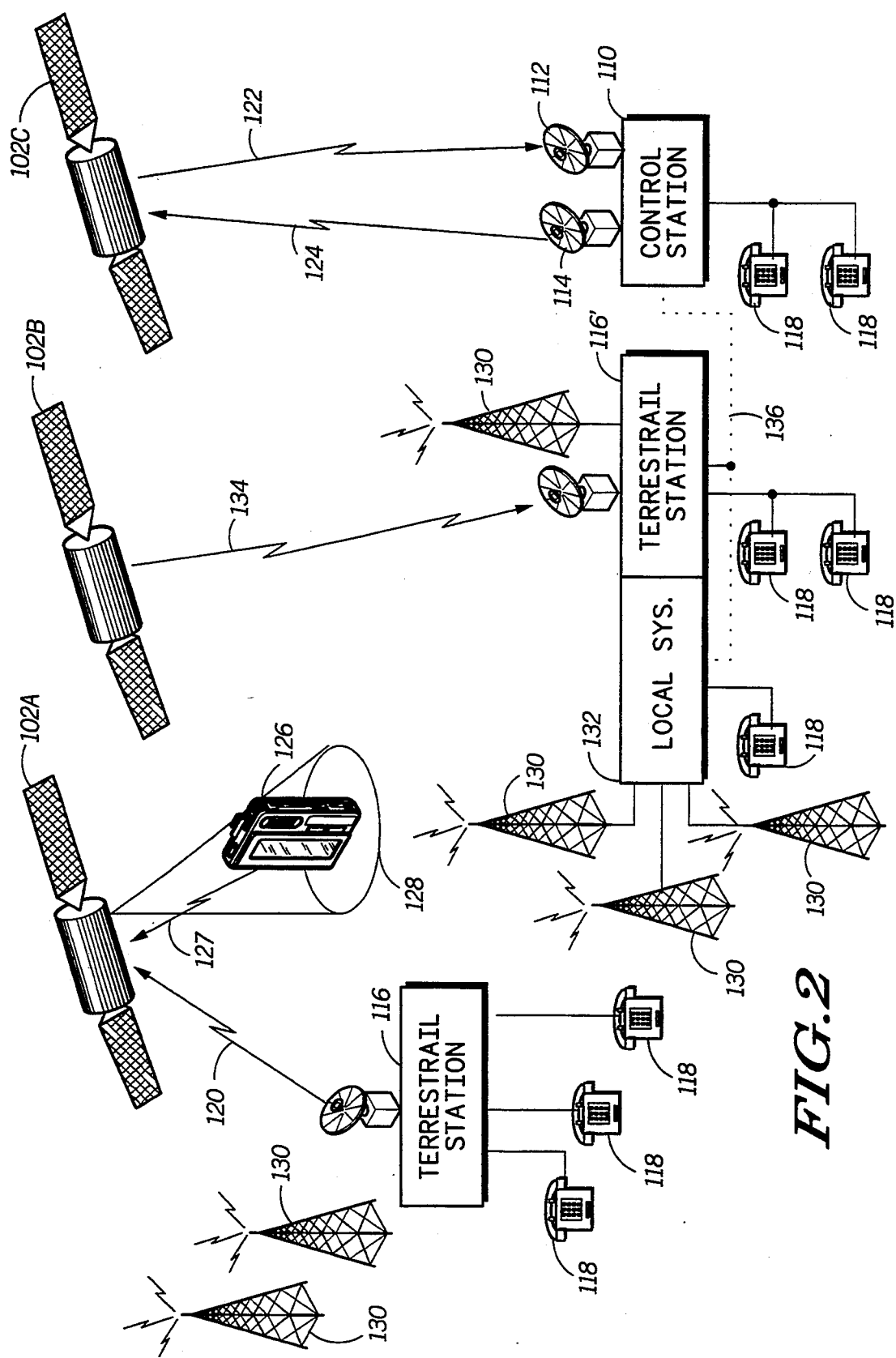
FIG. 2 is a diagram illustrating system operation in accordance with the present invention.

Referring to FIG. 2, a more detailed illustration of a portion of the global paging system is shown. As discussed in conjunction with FIG. 1, the present invention employs an orbiting space-based backbone of satellites 102a–102c (three shown) that orbit the planet in a plurality of orbits. A coordinating intelligence for the system is provided by a control station 110, which essentially comprises a large computing center (or other suitable information storage and processing center) that maintains a data library of every paging receiver registered to operate on the global system, together with its preferred (or default) location to receive paging messages, the current location of the paging receiver (if known), the preferred paging protocol, and other parameters as may be necessary or desired to provide an effective paging service. In the preferred operation, the control station 110 receives messages from the satellite presently positioned above the control station by an antenna 112, which routes all incoming paging requests from around the planet. Outgoing paging information is provided by an antenna 114 to the satellite network so that the paging information may be directed to the appropriate paging receiver(s). Optionally, more than one control station could be used, however, the maintenance of the data base library could be more difficult. In any event, the paging information is processed by the control station 110 to include information as to where and how the paging message should be delivered. This processing would include frequency selection, protocol selection, message routing information (depending upon the paging receiver's current location), and other information such as whether the satellite should deliver the page directly and/or via an optional terrestrial station located in the approximate geographic area of the paging receiver (if the system is so structured to allow terrestrial station paging transmissions).

To initiate a page, individuals contact the control station (directly or indirectly) via a public or private telephone-type network (not shown). Optionally, the system may employ one or more terrestrial stations 116, which may also be contacted using these telephone-type devices 118. In this latter embodiment, the terrestrial station 116 relays the paging message by any appropriate protocol to a satellite (illustrated as 102a) via transmission 120. Upon receipt of this information, satellite 102a determines that it is not currently over the control station, and therefore relays this information via the satellite network to an appropriate satellite for downlink transmission to the control station. Thus, in this example, the message would proceed from satellite 102a to 102b, and then by another intersatellite link to satellite 102c. Since the control station 110 resides within the transmission "footprint" of satellite 102c, the paging request is broadcast to the control station 110 by a transmission 122.

Upon receipt of a paging request the control station analyzes the identification (ID) code of the selective call receiver to be paged to determine the current location of the paging receiver or the service area requested by the paging receiver. That is, each individual having a paging receiver operative in the present inventive system is permitted to define the service area in which he or she wishes to receive paging information. Thus, an individual may elect to receive paging information only within one city or municipality. Others may wish to receive paging information in multiple states. Still others may desire to receive information across entire countries, continents, or globally so that they may receive a paging message wherever they are in the world. The present invention contemplates that the central station 110 will maintain this information for each selective call receiver registered to operate within the global system. In this way, the user may specify the default coverage area desired. That is, the control station may cause the system to deliver the paging message to each area specified by the paging user. Alternately, however, if the current location of the paging receiver is known, the paging message may be directed solely to that area to reduce paging traffic over the satellite network. Accordingly, the control station processes the incoming paging requests and instructs the satellite network where the paging information should be delivered based upon the instructions of the individual to be paged, and the current location of the paging receiver (if known). Should this individual desire to travel or otherwise change his or her default location(s) for receiving messages (whether permanently or temporarily), that person must inform the paging service provider so that the control station's data library may be updated. Additionally, by examination of the geographic area of the message delivery site(s), the required transmitter power of each satellite may be determined. That is, if the paging message must be delivered to a large city, the satellite over that city may be instructed to transmit the message at full power so as to facilitate proper reception in the "noisy" (e.g., high interference) metropolitan environment. Conversely, if the message is to be delivered to a rural location, the satellite above this location may be able to transmit the paging message at a reduced power level since interfering signals should be greatly reduced as compared to a large metropolitan area.

The control station 110 also determines how the paging message should be delivered to the individual being paged by examining the data library to extract information identifying the preferred paging protocol and operational frequency(ies) of the selective call receiver to be paged. This information is also preferably provided by the paging service provider at the time of registration of a pager on the global system. Of course, this information may be updated from time to time if the individual purchases another selective call receiver or is temporarily using a loaned pager during the repair of his or her registered receiver. After determining where and how the paging information should be delivered, the control station 110 returns the paging information to the satellite network (satellite 102c in FIG. 2) via transmission 124. In this example, satellite 102c receives the paging information that is to be directed to the area below the transmitting "footprint" of satellite 102a. Accordingly, the paging information is routed through satellite 102b to 102a, where the paging information is transmitted at a selected power level to a paging receiver 126 operating in the geographic region covered by the satellite 102a. Preferably, as will be hereinafter described in further detail, each of the transmitting beams from the satellite comprises thirty-seven (37) individual transmitting lobes; these lobes collectively representing the largest "footprint" in which the satellite may communicate information.

According to the invention, correct reception of the paging message by the paging receiver 126 is acknowledged by the transmission of an acknowledge signal 127. The acknowledge-back signal 127 is transmitted from the pager 126 to the satellite (102a in this example) at a power level that is preferably specified (or selected) by the user of the pager. Alternately, the acknowledge-back power level may be determined by analysis of the incoming paging message using known techniques. In any event, when the satellite receives the acknowledge-back signal, the control station 110 is informed of the proper delivery of the paging message. Moreover, if the paging message has been transmitted (by user instructions) to several areas, the pager's location may be determined (in rough measure) by the acknowledge-back signal. That is, since the pager will acknowledge only the transmission it receives, the control station will be able to track the paging receiver's current location by noting where the acknowledge-back signal originated. In this way, future paging messages need not be sent to several locations (even if specified by the user) since the system knows approximately where the pager is. However, should the pager fail to acknowledge the next paging message, the page will be re-transmitted to each of the specified "default" areas per the user's instructions. In this way, the pager can be located so the movement around the planet may be tracked and satellite traffic can be controlled.

For delivery of other paging messages, the optional terrestrial stations 116 may be employed to receive information from the satellite network and route the paging information through local transmitting sites 130. These paging events may be executed using the same protocol as the down-link transmission from the satellite, or by translating the down-link protocol into another protocol (i.e., a protocol compatible with the selective call receiver to be paged) so as to be adaptive to the paging receiver that is intended to receive the paging message. Moreover, the terrestrial stations of the present invention, can be coupled to a contemporary local paging system 132, so as to provide paging messages to existing paging receivers that are not capable of receiving paging messages directly from the satellite network. Thus, a paging message received in transmission 134 by the terrestrial station 116' can be processed and converted to paging information recognizable by the existing local paging system 132. The converted paging information would be processed and disseminated to the transmitting sites 130 associated with the local system in the same manner as any local paging request. As is known, the transmitting sites 130 may represent centralized transmitting sites for different areas or cities, or may be simulcast transmitting sites to provide contemporaneous transmission coverage to a wider geographic area. In any event, the present invention fundamentally contemplates communicating directly from the satellite network to paging receivers, but also may include a full planetary system network utilizing existing contemporary equipment, or terrestrial based relay stations to repeat or simulcast paging information on an appropriate paging protocol and frequency so as to support large municipalities. In this embodiment, the terrestrial stations may be used to off-load a portion of the paging traffic from the satellite network, provide an alternate transmission point in circumstances where the paging receiver cannot correctly receive the paging information directly from the satellite network (i.e., shadowed), or convert the down-link protocol to a protocol and frequency compatible with contemporary equipment.

According to the invention, ground station transmitted paging message are acknowledged to the transmitting ground station, while satellite paging transmissions are acknowledged to the satellite. This process allows the optional ground station to also control its transmitter power, and provides a route (directly or via the satellite network) to return the pager's current location to the control station 110.

Additionally, those optional terrestrial stations and local systems physically residing in the geographic area that the control station 110 is physically located may communicate directly with the control station 110 via a direct communication link 136. This eliminates the need to go to the satellite network to communicate paging requests. As will be appreciated by those skilled in the art, the transmitting footprints of the satellites 102 cover a wide geographic area. Those terrestrial stations and local systems within the same operating footprint as the control station may therefore be coupled directly to the control station 110, since communications between such sites would be repeated by the satellite above both of them.

THE SATELLITE(S)

Figure 3:
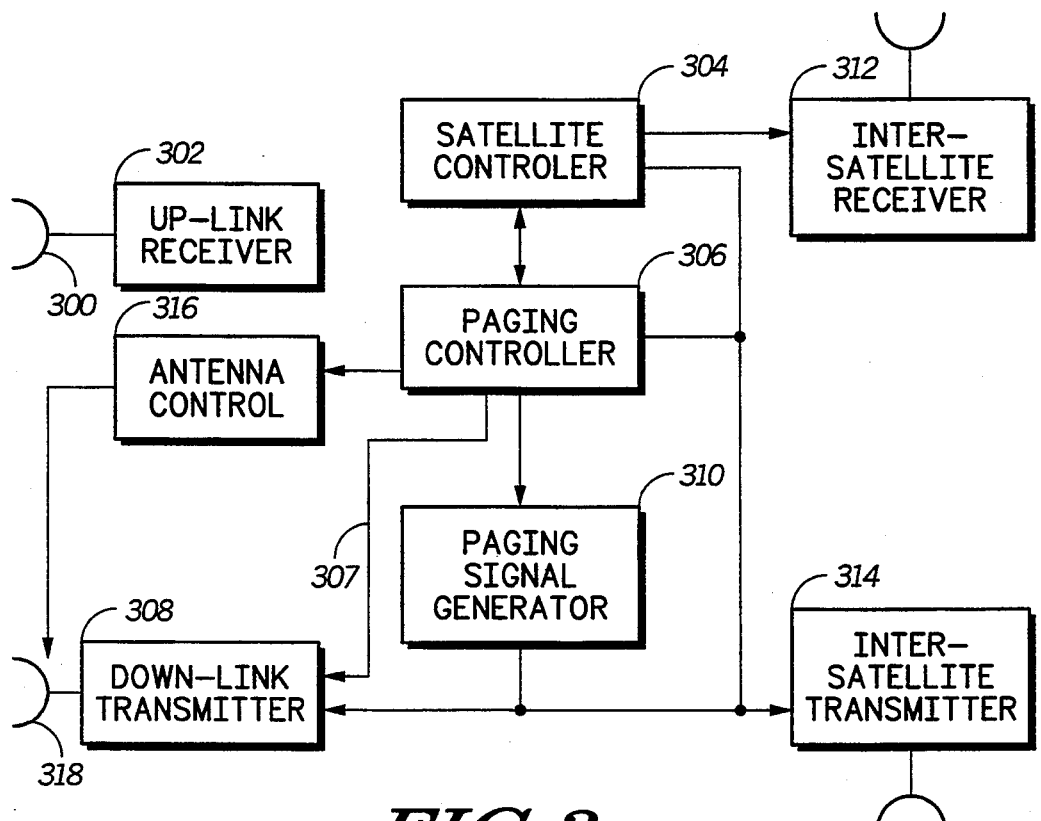
FIG. 3 is a block diagram of a satellite of FIGS. 1 or 2.

Referring to FIG. 3, a satellite 102 is shown in block diagram form. Preferably, each satellite comprises a conventional low-orbiting satellite such as those commercially available. Each satellite is placed in orbit by a suitable launch vehicle such as via America's Space Shuttle Program. According to the invention, the preferred orbit is one that is highly inclined, so as to provide effective global communication coverage. Lower inclination orbits may also be used, however, additional satellites would be required to achieve effective communication coverage. Once in orbit, a conventional solar cell array (see FIG. 2) is opened to provide power to the satellite 102. Following this, the satellites are brought "on-line" using known techniques, such as, for example, by using contemporary telemetry, tracking, and control (TT&C) protocols to form a satellite network. As is known, the solar cell array provides electrical power to the satellite. This power is limited, however, by that portion of time that the celestial body blocks solar rays from a star (sun) in the particular solar system in which the celestial body resides. If each satellite transmitted each paging message at full power, a satellite's power supply may become critically limited or exhausted during the time interval that the solar cell array is unable to replenish the satellites energy storage means. Thus, the present invention operates to control the satellite's transmitter power to conserve energy and promote efficient system operation.

Up-link transmissions are received by an up-link antenna 300 and decoded by an up-link receiver 302. The up-link receiver is coupled to a conventional satellite controller 304 and a paging controller 306 so as to appropriately route satellite control information and paging information (including the acknowledge-back signals). The satellite controller 304 performs conventional satellite control functions such as orbit maintenance, position tracking, and other appropriate functions as directed by control personnel on the planet. The satellite controller 304 is also coupled to the satellite's down-link transmitter 308, so as to provide any information requested by ground based control personnel.

As shown in FIG. 3, the payload of the satellite 102 is occupied by the paging controller 306 and a paging signal generator 310. Upon receipt of paging information, the paging controller must determine whether to transmit the paging message toward the planet (i.e., page a selective call receiver or optionally to send the page information to a ground station for retransmission to the selective call receiver), or to another satellite (for routing to the control station or another satellite for transmission) in the satellite network. Accordingly, an inter-satellite receiver 312 and transmitter 314 are coupled to the paging controller 306 so that the paging information can be appropriately routed. Additionally, the satellite controller 304 is coupled to the inter-satellite receiver and transmitter so as to communicate network control information as required for the maintenance of the satellite network. Optionally, a single inter-satellite transceiver may be used provided that its has a steerable antenna system to be able to communicate with its neighboring satellites in the satellite network. Also, multiple inter-satellite transceivers could be used provided that the satellites size and weight were not adversely impacted, and so long as it is not cost prohibitive.

The paging controller 306 determines what and how to transmit in large part in response to the type of information received. For example, up-link transmissions from a ground station (e.g., paging requests or acknowledge signals) should ordinarily be routed to the control station, while up-link transmissions from the control station usually contain information as to where and how the paging message should be delivered. Inter-satellite communications can, of course be either paging requests, acknowledge signals, or paging information, and the paging controller determines appropriate routing chiefly by examining its present position (which is monitored by the satellite controller 304) and the destination of the request or information. Should the satellite controller determine that the received paging information should be transmitted toward the planet, the paging signal generator 310 is used to provide the appropriate protocol and frequency selection. That is, the paging signal generator may deliver the paging information using any known paging protocol (or any convenient protocol if transmitting to an optional ground station) when transmitting to the selective call receiver hereinafter described. For each paging transmission, this information is preferably provided by the control station, or defaults to a predetermined protocol. Additionally, the down-link frequency selection is also made in accordance with the delivery instructions provided by the control station.

Prior to the actual transmission, the paging controller 306 examines the paging information to determine the desired communication coverage specified by the individual to be paged. According to the invention, this information is provided to the paging controller by the control station and is provided to an antenna control system 316 to adjust the "footprint" of the satellite's transmission beam. This is preferably accomplished by controlling which of a plurality of individual transmission lobes are activated (via antenna control 316), and the power (via control line 307) of each activated lobe. According to the invention, the down-link antenna comprises one that has thirty-seven transmission lobes. In this way, relatively fine control of the satellite's transmitting signal may be achieved. That is, if the paging message is to be directed toward a large metropolitan area, the transmitter power for each activated lobe may be set at full power. Conversely, a lower transmitter power setting may be used on one or more lobes to deliver a paging message to a rural area. Also, regardless of the initial power setting, if the paging receiver does not acknowledge receipt of the paging message, the transmitter power in increased (up to full power) and the paging message is re-transmitted. In this way, satellite power is conserved.

Figure 4:
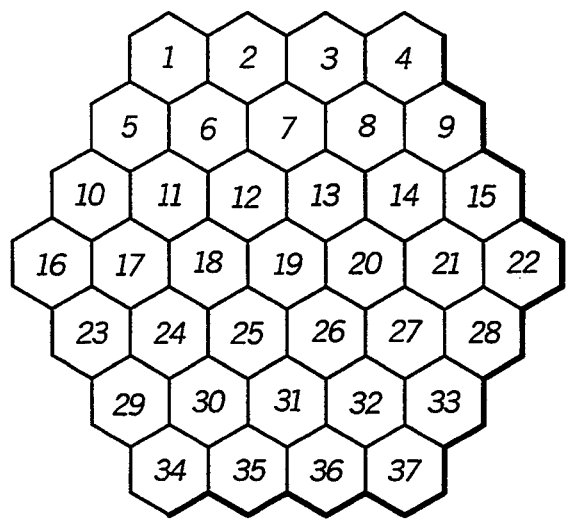
FIG. 4 is an illustration of a satellite transmission footprint.

Referring to FIG. 4, a graphical depiction is provided to illustrate the preferred satellite transmission "footprint". As previously mentioned, the preferred satellite down-link transmitting system includes an antenna having a plurality of individual lobes. In FIG. 4, the hexagonal cell format commonly used in conjunction with cellular telephone service is used for convenience to illustrate to user selectable coverage aspect of the present invention. Those skilled in the art will appreciate that the actual transmission patterns of the satellite's antenna lobes do not comprise perfect hexagons.

According to the invention, each individual is permitted to specify the areas in which he or she will receive paging messages. For example, if an individual only wished to receive pages at home or in the office, areas 17 and 12 may be specified. In an alternate example, wider coverage may be provided by specifying areas 12–14, 18–20, and 25–26. In fact, any arrangement of coverage areas (contiguous or non-contiguous) may be provided including receiving paging information under the entire thirty-seven transmitting lobes of one satellite and some or all of the lobes of any of the other satellites in the entire satellite network. In this way, paging service may be provided using any paging format or protocol on a global coverage basis for those desiring such coverage, while local area coverage may also be provided to those desiring only local coverage and the lower operational costs associated therewith.

Figure 5:
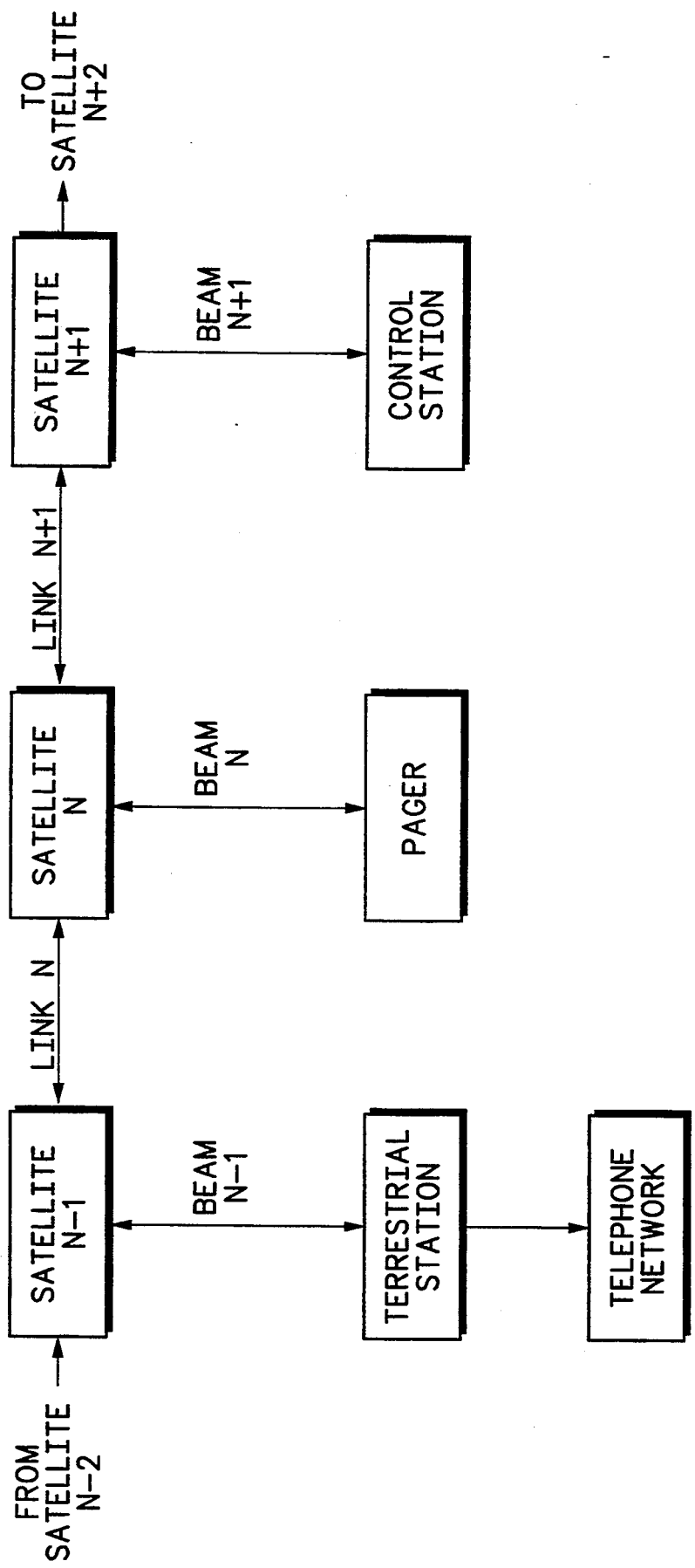
FIG. 5 is a diagram illustrating satellite communication paths and links.
Figure 6A:
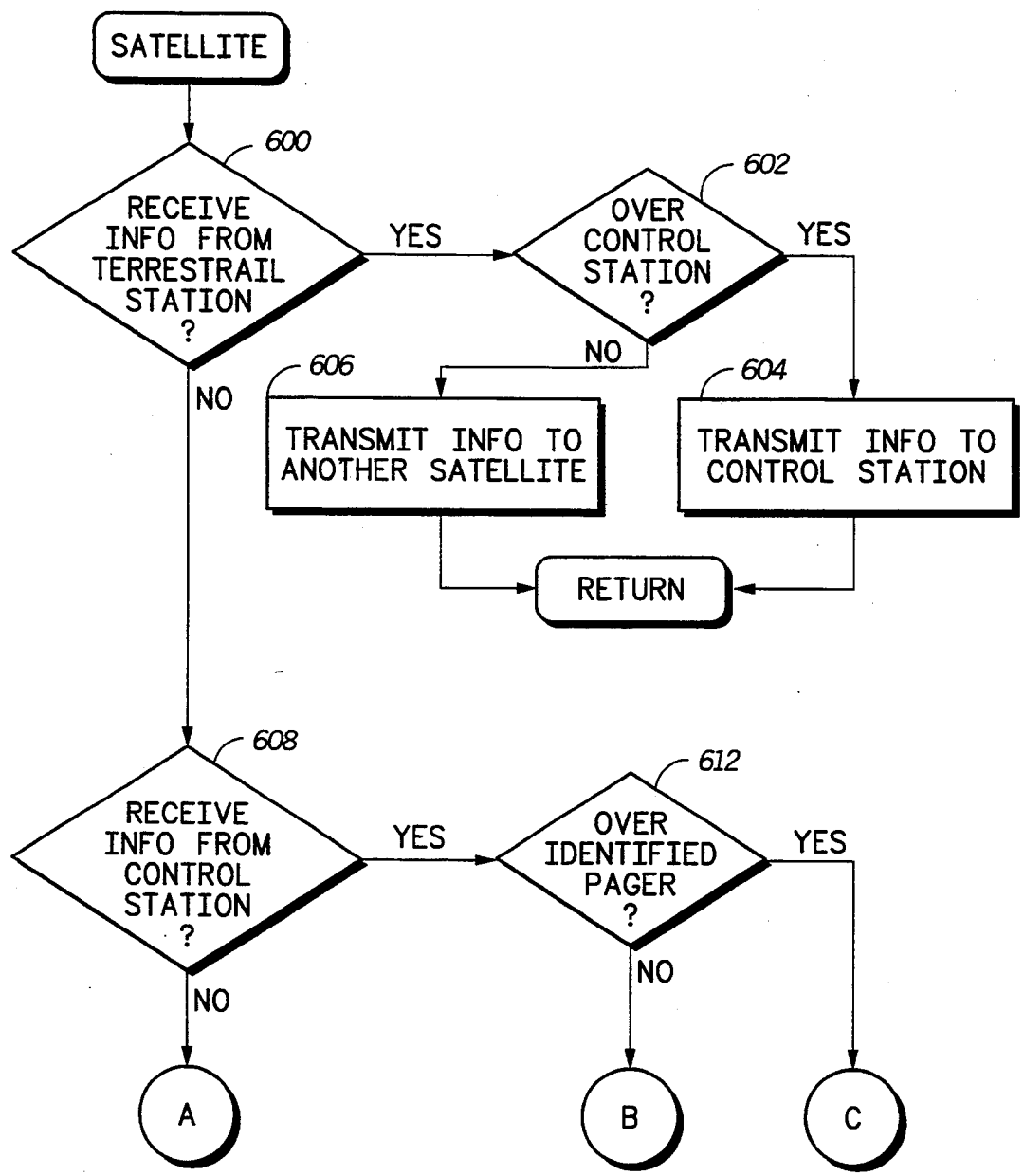
FIGS. 6a–6d are flow diagrams outlining the operation of the satellites of FIGS. 1, 2 or 5.
Figure 6B:
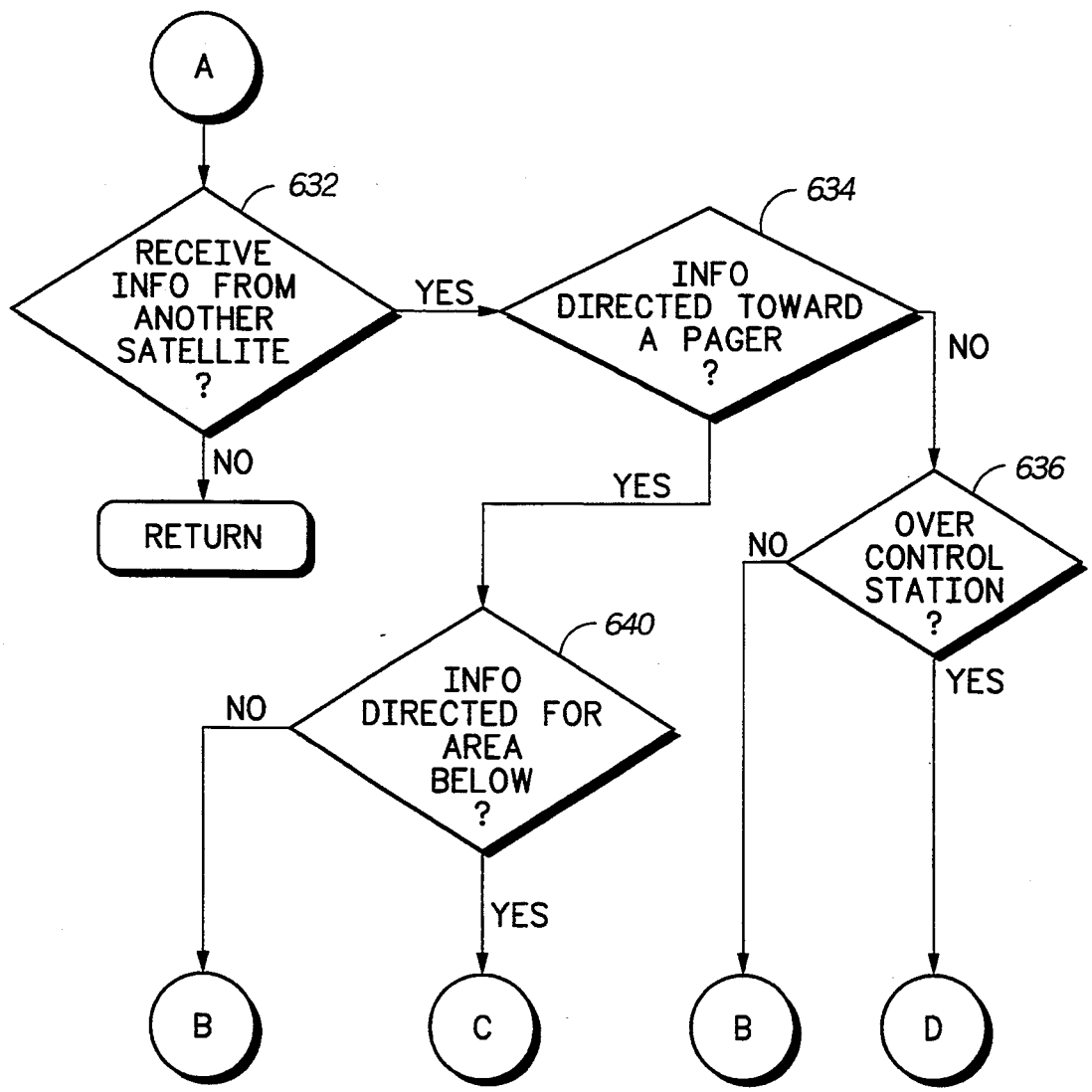
Figure 6C:
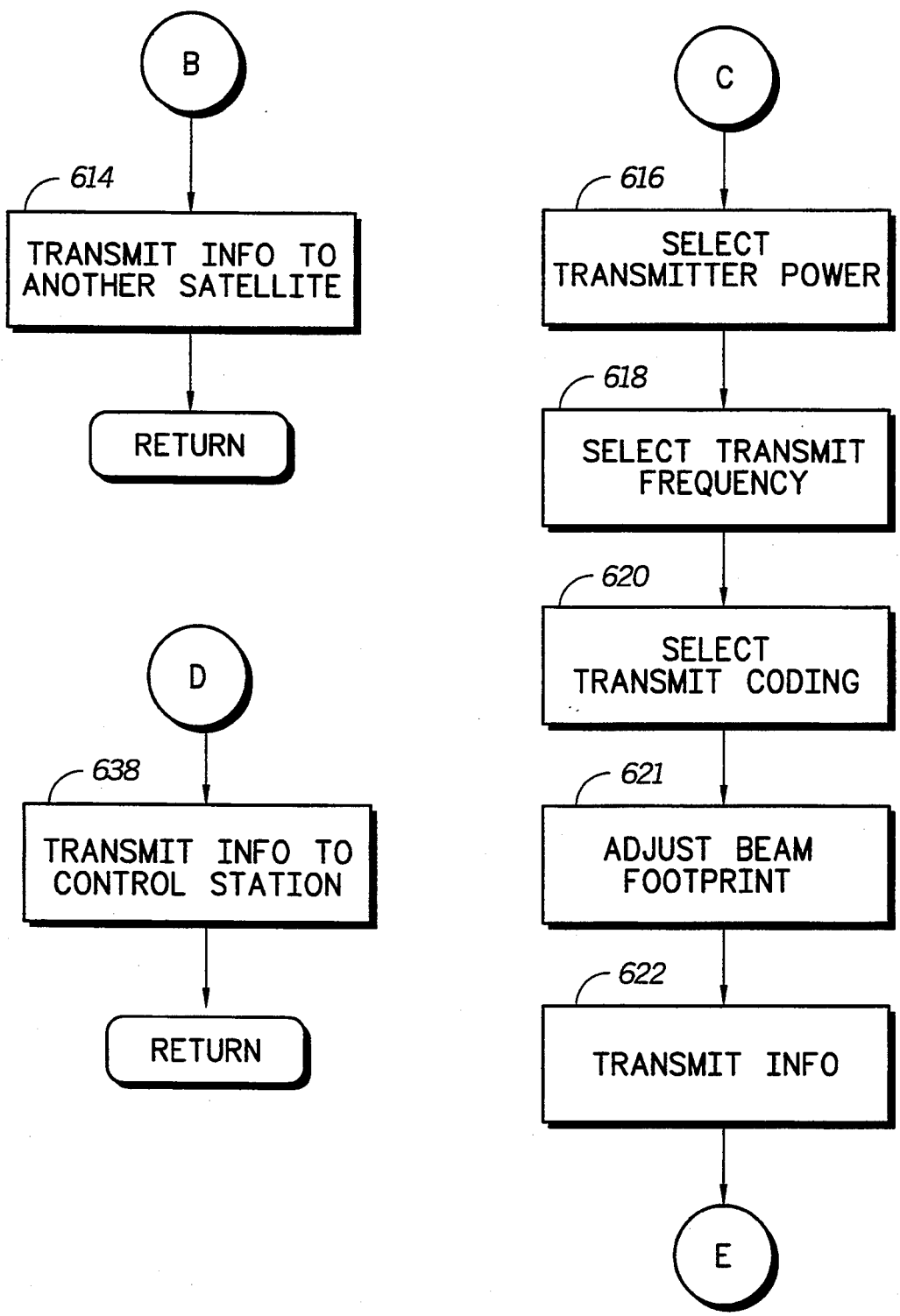
Figure 6D:
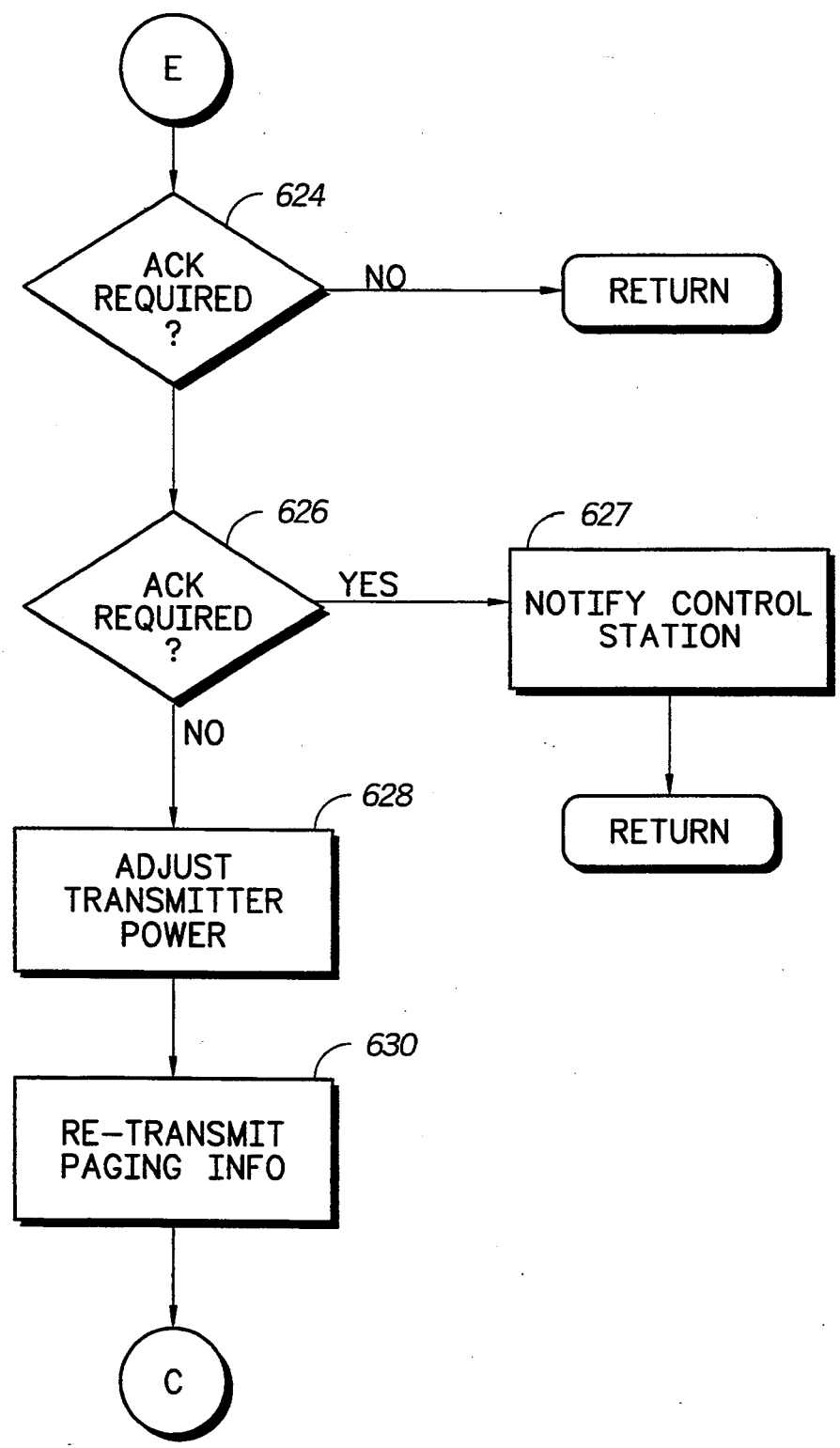

The satellites' communication abilities may be further described in conjunction with FIG. 5. Three satellites are shown engaged in both inter-satellite communication and terrestrial up-link/down-link communication. The illustrated satellites (N−1, N, and N+1) may be satellites in the same orbiting plane, or may represent one satellite in three contiguous orbit planes. In either event, inter-satellite communications is the same. That is, each satellite is capable of communicating with a previous and next satellite in the same orbiting plane, and with a satellite in a previous and next orbit. This arrangement provides a satellite network capable of effectively disseminating paging information to any point on the orbited celestial body.

As shown in FIG. 5, satellite N communicates information with satellite N−1 via link N, and with satellite N+1 via link N+1 (and so on). These transmissions are made using the inter-satellite transmitter and receiver (or optional transceiver) discussed above in conjunction with FIG. 3. In one embodiment, conventional microwave communication is used for the inter-satellite links, although known optical media (e.g., lasers) may be used if not cost prohibitive.

Also illustrated in FIG. 5 are the fundamental up-link and down-link communication abilities of the satellite network of the present invention. As shown, satellite N−1 may communicate with an optional terrestrial or ground station that may in turn be coupled to an existing conventional paging network. When terrestrial stations are used, the communication path (Beam N−1) is usually bidirectional so that acknowledge signals and paging requests received via telephone-type networks may be forwarded to the control station, while paging information can be received and processed from the satellite network. Alternately, if desirable in any particular implementation, a terrestrial station may utilize only an up-link or a down-link communication path.

Satellite N is shown communicating directly with a pager via Beam N. This link is also bi-directional in that paging information may be beamed from a satellite directly to one or more pagers, and acknowledge signals from a pager may be returned to the satellite. Additionally, this link also provides communication in those area of the planet that does not have existing equipment and where it would be un-economical or otherwise undesirable to locate a ground station. An acknowledge-back paging receiver suitable to receive paging information directly from the satellite network is hereinafter described.

Another fundamental communication page is illustrated as Beam N+1 from satellite N+1. In this example, satellite N+1 is the satellite over the control station, and therefore, is the satellite ultimately responsible for finally communicating paging requests to the control station (if terrestrial stations are used), and for initially receiving paging information from the control station. According to the invention, the inter-satellite and up-link/down-link communication capabilities of the satellite network permit an individual having a paging receiver to receive paging messages anywhere on the celestial body.

Referring to FIGS. 6a–6d, the preferred operation of the satellites is shown. Assuming that terrestrial stations are used, the routine begins with decision 600, which determines whether information has been received from a ground station. An affirmative determination from decision 600 generally means that a paging request has been transmitted from one of the ground stations and should be directed to the control station for a determination of where and how the paging message should be delivered. Alternately, this information could represent acknowledge information for the control station. Accordingly, decision 602 determines whether the satellite is presently over the control station. This determination is accomplished using known mechanisms within the satellite controller by examining the current position of the satellite over the planet and comparing this information with the known location of the control station. If the determination of decision 602 is that the satellite is currently over the control station, the information is transmitted to the control station (step 604). Conversely, a negative determination of decision 602 results in the information being transmitted to another satellite (step 606). As previously discussed, the other satellite may either be in the same orbiting plane or an adjacent orbiting plane as that of the satellite that first received the information. In this way, the information progresses through the satellite network until it is directed to the control station.

Assuming that the determination of decision 600 is that information was not received from a terrestrial or ground station, the routine proceeds to decision 608, which determines whether information has been received from the control station. According to the invention, the control station processes each paging request and makes determinations as to where and how the paging message should be delivered. Therefore, the control station typically up-links all paging information to the satellite network for appropriate distribution through the satellite network and back to the planet (either directly or by way of a terrestrial or local station). Thus, should the determination of decision 608 be that the information was received from the control station, the routine proceeds to decision 612, which determines whether the satellite is presently over the identified pager (or pagers) that is to receive the paging message. If not, the routine proceeds to step 614, where the information is transmitted to another satellite in the same orbiting plane or an adjacent orbiting plane so as to deliver the paging message to the paging receiver as directed by the control station. Conversely, if the determination of decision 612 is that the pager is within the communication abilities of the satellite, the routine proceeds to step 616, which selects the appropriate transmitter power for the transmission of the paging message. This determination may be based upon whether the paging message is to be acknowledged by the receiving pager(s), by instructions provided by the control station or paging user. In any event, the satellite's transmitter power is set and the routine proceed to step 618, where the preferred paging transmit frequency and protocol are selected (steps 618 and 620) in accordance with the preferred message delivery request according to the instructions of the paging subscriber and commanded by the control station. Once these adjustments have been made, the antenna beam (footprint) is adjusted (step 622) in accordance with the instructions provided by the control station. As previously mentioned, the control station instructions are generated primarily based upon the coverage wishes and desires of the individual users, and determines (in part) the amount of billing that will be generated for the paging event. After the beam of the satellite has been appropriately adjusted, the information is transmitted (step 622) towards the planet to be received by the paging receiver(s).

After the satellites transmission of the paging information, the routine proceeds to decision 624, which determines whether the paged selective call receiver must acknowledge reception of the message. If so, decision 626 determines whether the acknowledge signal has been received. If so, the control station is so notified (627) (either via the satellite network or via direct transmission) that the paging information was received by the designated pager(s). Conversely, if the determination of decision 626 is that the acknowledge signal was not received, the transmitter power is adjusted (i.e., increased) (step 628) so as to increase that probability of correct reception upon re-transmission of the message (step 630). In this way, satellite power is conserved by using lower power transmissions whenever possible, and adjusting (increasing) the satellite's transmission power level only when required.

Assuming that the determination of 608 is that information was not received from the control station, the routine proceeds to decision 632, which determines whether the information was received from another satellite. If so, decision 634 determines whether the information is directed towards a paging receiver. That is, aside from general satellite control and orbit maintenance information, an inter-satellite communicate is generally information being directed towards the control station, or information from the control station being directed towards one or more pagers. Thus, a negative determination of decision 634 causes decision 636 to determine whether the satellite is currently over the control station. If not, the information is transmitted to yet another satellite in the satellite network so as to direct the information to the control station (step 614). However, if the satellite is over the control station, step 638 transmits the information to the control station for processing as previously discussed. Conversely, if the determination of decision 634 is that the information is directed towards a pager, decision 640 determines whether the information is directed for the area within its beam "footprint". If not, the pager (or pagers) that are to receive this message are not beneath the satellite, and therefore, the paging information must be forwarded to another satellite for delivery (step 614). However, if the determination of decision of 640 is that the information is directed for the geographic area below, the routine proceeds to that transmission and acknowledge steps 616–630.

THE CONTROL STATION(S)

Figure 7:
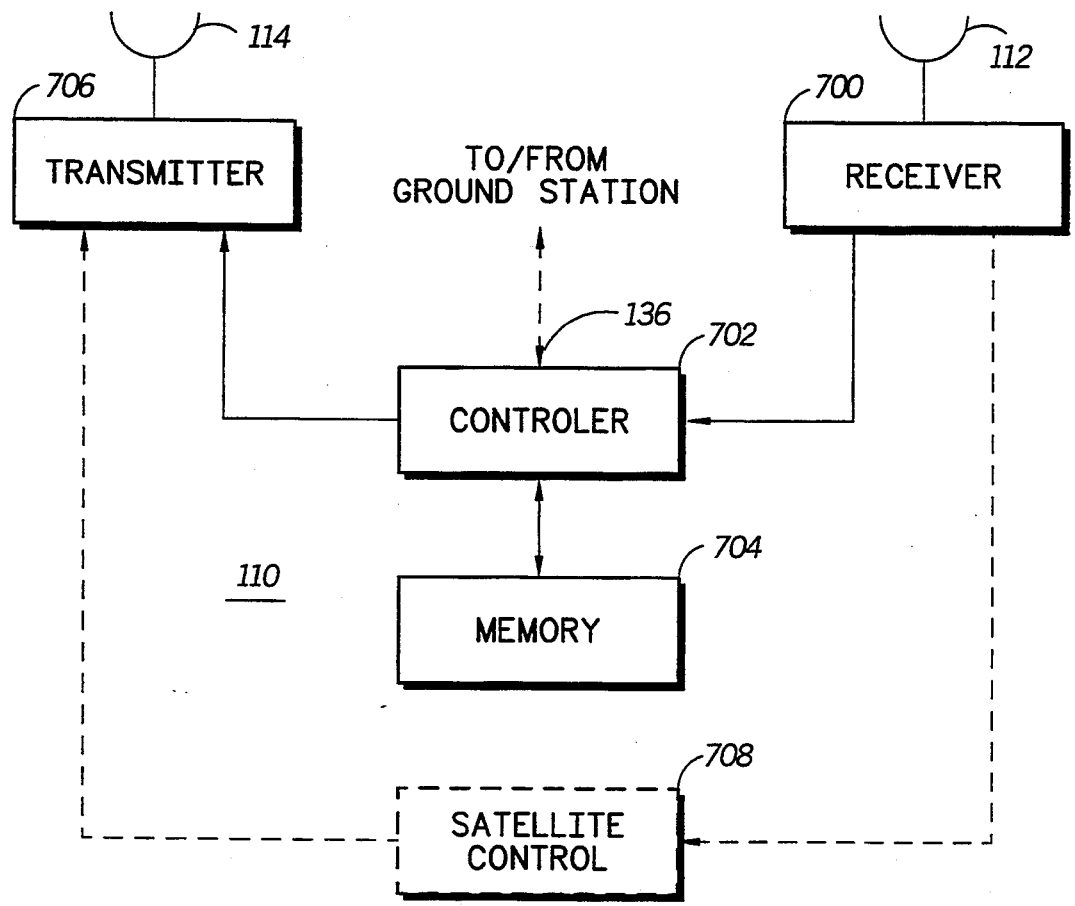
FIG. 7 is a block diagram of the control station of FIGS. 2 or 5.

Referring to FIG. 7, a block diagram of the control station 110 is shown. The control station 110 receives information from the satellite network via a receive antenna 112 and a receiver 700. This information is routed to a controller 702, which in one embodiment comprises an MC68030 microcontroller manufactured by Motorola, Inc., or its functional equivalent. The controller 702 operates to process paging requests to determine where and how the paging messages should be delivered. This is accomplished primarily by examination of a data library stored in a memory 704, which contains a suitable amount of type of memory to store operating characteristics and instructions for each receiver registered to operate on the global paging system. Additionally, if the pager's location is known from a prior message acknowledgement, the determination of where and how to deliver this paging message may be simplified. After processing this information, the paging message is forwarded to a transmitter 706 for transmission via an antenna 114 to the satellite network. Optionally, satellite control circuitry 708 may be resident within the central station (and each terrestrial station) to provide satellite orbit maintenance, position tracking, and other control functions well known in the art for maintenance of the satellite network. Alternately, satellite control maintenance may take place from one or more another facilities designed to track and maintain the satellite network. As previously discussed, for the optional terrestrial stations and local systems within the same physical area of the control station 110, an optional direct link 136 may be used.

Figure 8:
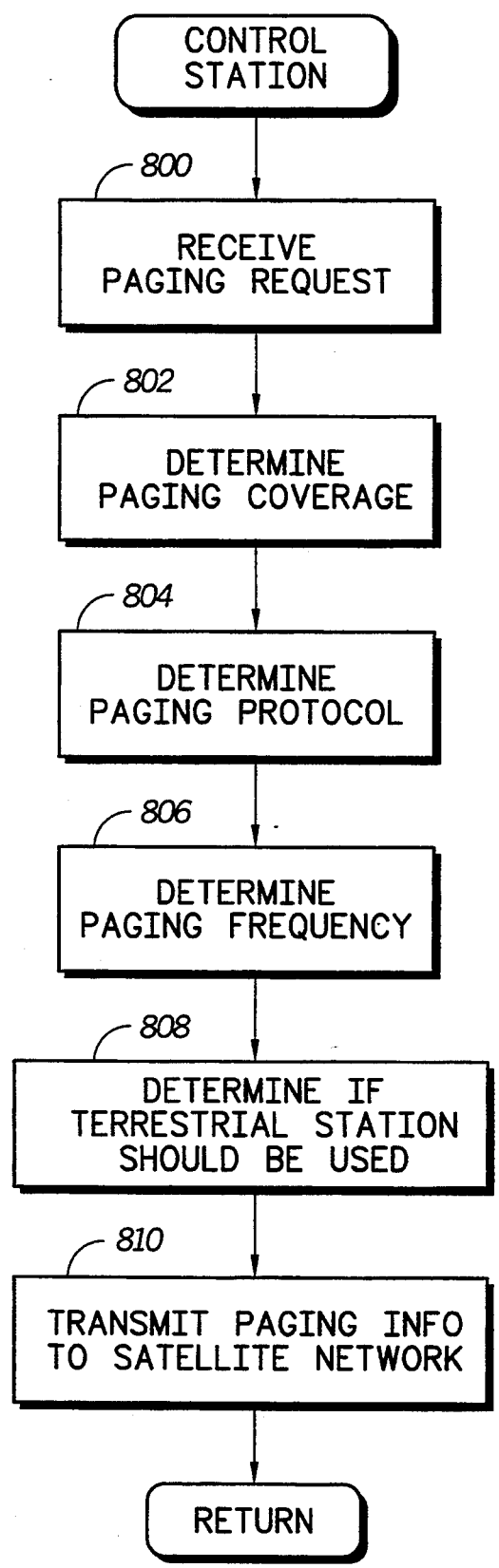
FIG. 8 is a flow diagram illustrating the operation of the control station of FIG. 7.

Referring to FIG. 8, the routine followed by the control station 110 to process a paging request is shown. In step 800, a paging request is received by the control station. Following this, the controller 702 examines the memory 704 to determine the amount of paging coverage desired by the individual user and whether the pager's current location is known. Also, the memory 704 contains information specified by the user for defining the preferred paging protocol that should be used (step 804). Additionally, the paging frequency has preferrably also been specified by the paging user (step 806).

Finally, the control station 110 determines whether an optional terrestrial station should be used to relay the information (either directly or through a conventional local system) to the paging receiver. In this way, the paging receiver can receive a paging message directly from the satellite, from an optional terrestrial station (or both) or from an existing local system using any of the known (standard) paging formats so that the entire satellite network becomes transparent to the paging user.

THE OPTIONAL GROUND STATION(S)

Figure 9:
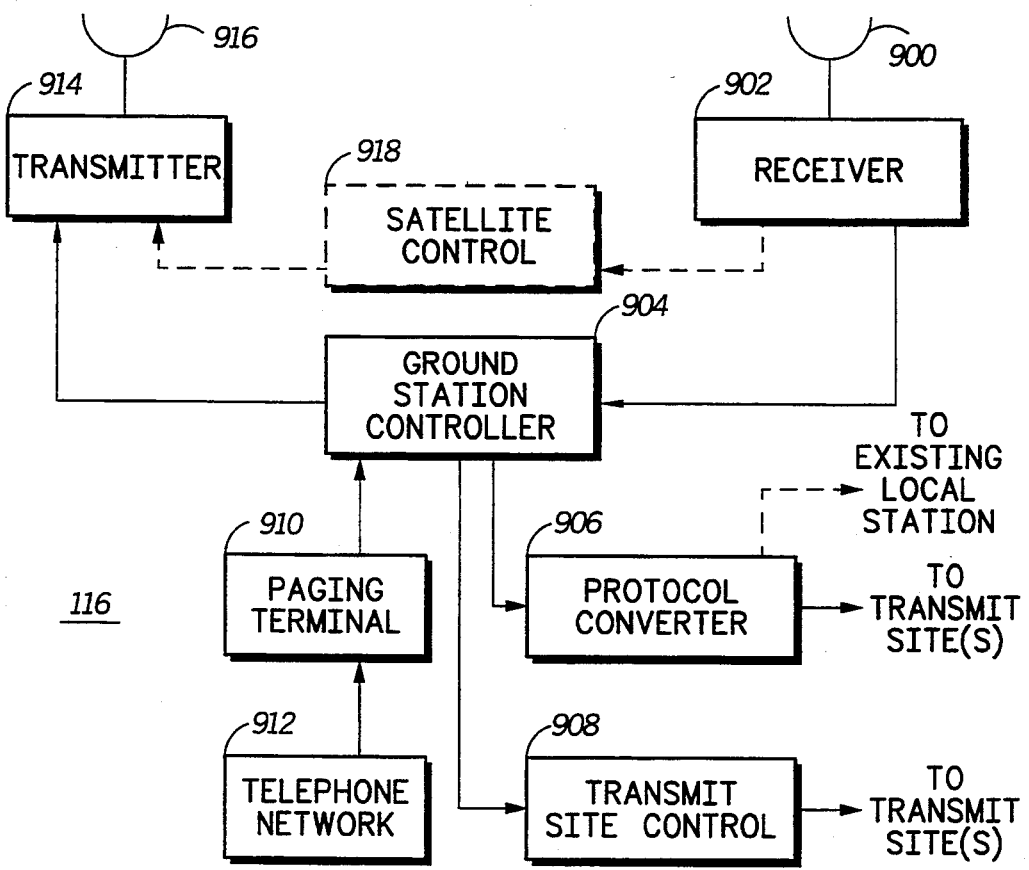
FIG. 9 is a block diagram of an optional ground station in accordance with the present invention.

Referring to FIG. 9, there is shown a block diagram of a terrestrial or ground station 116 that may optionally be used with the present invention. Down-link information from the satellite network is received by an antenna 900 and decoded by a receiver 902 of the ground station control 904. The ground station controller 904 processes this information to extract instructions from the control station as to the frequency and paging protocol that should be used in the delivery of the paging message to the paging receiver. The controller 904, in one embodiment, may comprises an MC68030 microcontroller manufactured by Motorola, Inc., or its functional equivalent. In accordance with the instructions from the control station, the ground station controller 904 controls the protocol converter 906 so as to select (or convert) to the appropriate protocol. Fundamentally, the protocol converter 906 operates to decode whatever format was used by the satellite for the down-link message to extract the paging message. Once the message has been extracted, it can be re-encoded in any selected paging protocol for subsequent transmission to the paging receiver. Typically, this is accompanied via transmissions from the transmit sites 130 associated with the terrestrial station, or by conversion of the paging message into a standard paging request to an existing local station 132 as has been previously discussed. In addition to selecting the appropriate protocol, the ground station controller 904 controls one or more transmit site controllers 908, which operate to control the local transmit sites 130 in parameters such as frequency selection, the number of sites that should transmit the signal, and whether the signal should be simulcast from several transmitters as is known in the art.

To generate a paging request, the ground station 116 incorporates a conventional paging terminal 910 to receive messages from public or private telephone networks 912. The paging terminal operates the format and generates the appropriate request, which is forwarded to the ground station controller before being transmitted to the satellite network via a transmitter 914 and an up-link antenna 916. Optionally, as discussed in conjunction with the control station, satellite control circuitry 918 may be incorporated into the terrestrial or ground stations to provide control and maintenance of the satellite network.

Figure 10A:
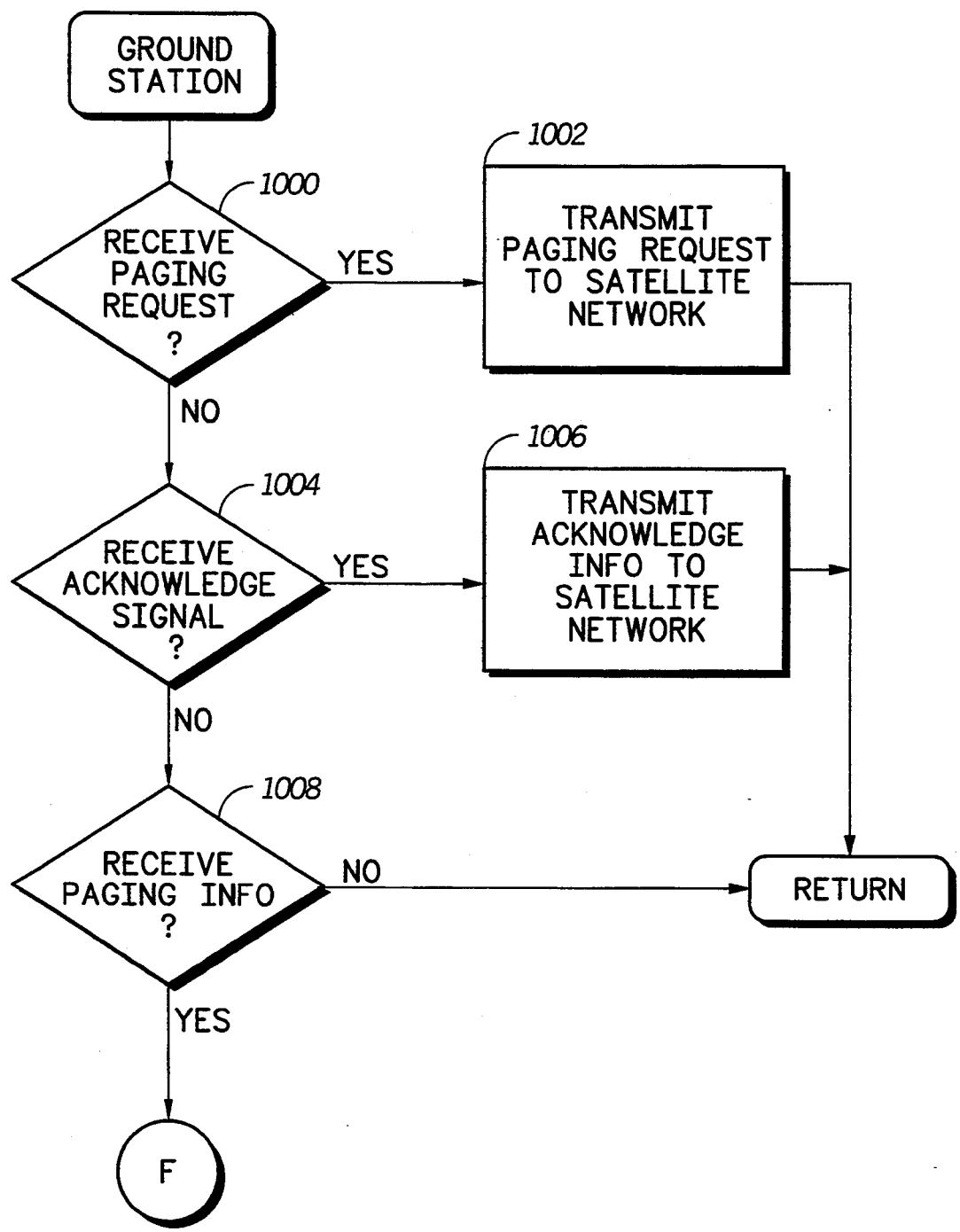
FIGS. 10a and 10b are flow diagrams illustrating the operation of the ground station of FIG. 9.
Figure 10B:
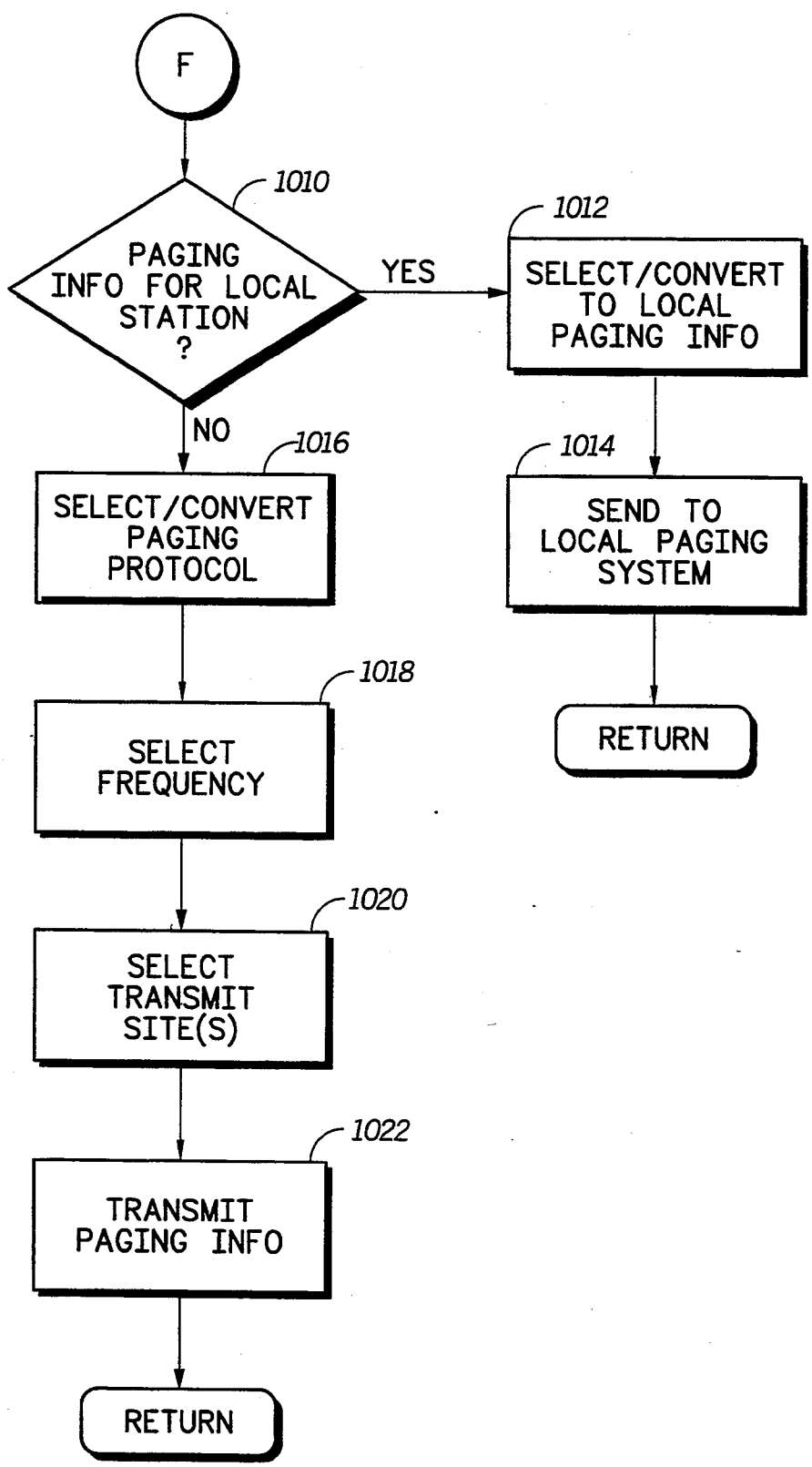

Referring to FIGS. 10a and 10b, the preferred sequence of operations of the ground station 116 is illustrated. The routine begins in step 1000, which determines whether a paging request has been received. If so, the request is properly formatted and transmitted to the satellite network for routing to the control station as has previously been described (step 1002). Conversely, if the determination of decision 1000 is that a paging request has not been received the routine proceeds to decision 1004, which determines whether acknowledge information has been received. An affirmative determination of decision 1004 causes this information to be transmitted to the satellite network (step 1006) bound for the control station. If neither paging requests for acknowledge signals are to be transmitted to the satellite network, decision 1008 determines whether paging information has been received from the satellite network. Is so, decision 1010 determines whether the paging information should be processed to represent an existing local paging request and forwarded to a contemporary local station for transmission. If so, the routine proceeds to step 1012, where the down-link protocol used from the satellite is converted into the appropriate paging format for the existing contemporary local system (which is sent to the local system in step 1014 for transmission).

Assuming that the determination of decision 1010 is that the paging information is not for a local station, the routine proceeds to step 1016 for transmission from the transmit site(s) associated with the terrestrial station. After examining the instructions from the control station, the terrestrial station operates to select the paging protocol or convert from the down-link protocol to appropriate paging protocol for the convenience of the paging receiver. Following this, the preferred paging frequency is selected in accordance with the user's instructions (step 1018). Next, the number and location of transmit site to be used to broadcast the message are determined (step 1020) prior to transmission of the paging information to the paging receiver (1022).

THE PAGING RECEIVER(S)

Figure 11:
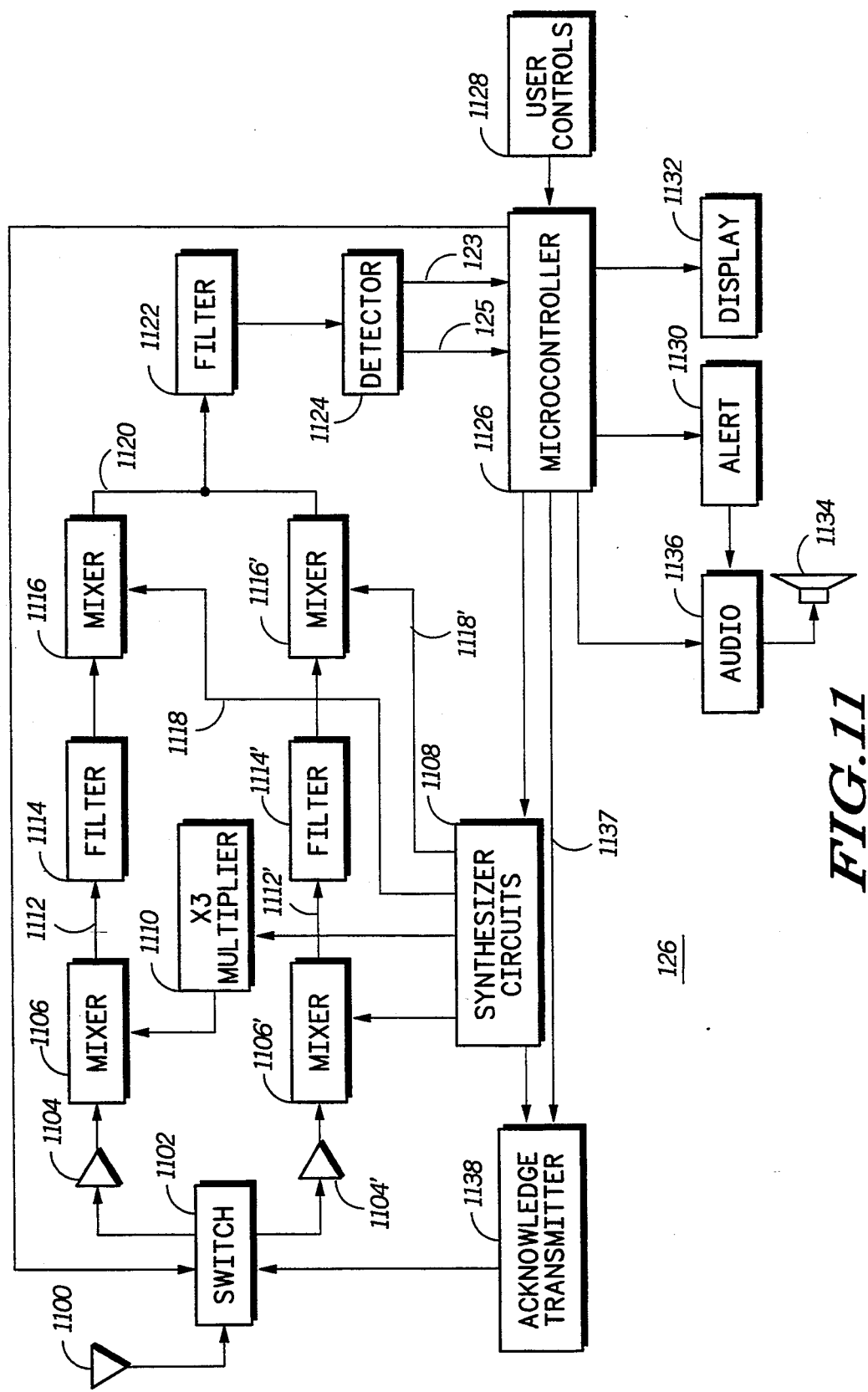
FIG. 11 is a block diagram of a selective call receiver (pager) in accordance with the present invention.

Referring to FIG. 11, there is shown a block diagram of an acknowledge-back paging receiver 126 in accordance with the present invention. Operationally, the paging messages are received by an antenna 1100, which is forwarded to an antenna switch 1102. In the receive mode, the position of the switch will route the received information either through the satellite compatible "front-end" portion or the terrestrial station compatible "front-end" of the paging receiver 126. Thus, one output of the switch 1102 routes the received signal to an an RF amplifier 1104, which preferably amplifies signal in the 1.5 GHz satellite frequency range. The amplified signals are applied to a mixer 1106, which receives a local oscillator signal from synthesizer circuitry 1108. To receive satellite based signals, the local oscillator signal is multiplied by a multiplier 1110 so as to appropriately demodulate the high frequency satellite signal. The mixer 1106 provides a first IF signal 1112 to an IF filter 1114, which is coupled to a second mixer 1116. The mixer 1116 accepts another local oscillator signal 1118 from the synthesizer circuitry 1108 and provides a second IF signal 1120, which is filtered by an IF filter 1122. According to the invention, this second IF stage is common to both the terrestrial and receiver recovery section of the paging receiver.

To receive signal from the optional terrestrial based equipment, the antenna switch 1102 may route the signal to an RF amplifier 1104', which comprises an amplifier designed to amplify frequencies in the UHF or VHF frequency range. This signal is mixed by a mixer 1106' to provide a first IF signal 1112' to an IF filter 1114'. The filter signal is again mixed in a second mixer 1116' by another local oscillator 1118' from the synthesizer circuitry 1108. This again produces the common second IF signal 1120, which is filtered by the second IF filter 1122. In either event, the filtered second IF signal is processed by a detector 1124, which recovers the paging information for further processing by a microcontroller 1126. In one embodiment of the invention, the microcontroller 1126 may comprise an MC68HC11 microcomputer manufactured by Motorola, Inc., or its functional equivalent.

To receive paging informations from any of the several known "standard" land base systems, a terrestrial station of the present invention, or directly from a satellite, the microcontroller 1126 controls the synthesizer circuitry 1108 so as to appropriately mix these signals down in the second IF signal 1120. Additionally, since the synthesizer circuitry 1108 is programmed by the microcontroller 1126, the paging receiver 126 of the present invention can scan several frequencies merely by reprogramming the synthesizer circuitry in any of the known synthesizer programming techniques known in the art.

According to the invention, the paging receiver 126 preferably operates in an automatic mode to first scan for a terrestrial based transmitter (if used) before relying upon the satellite network for direct transmission in any city or geographic area that offers a ground based transmitting site(s). That is, for the paging receiver 126 described herein, when the paging customer specifies the area or areas in which he or she desires to receive paging messages, if a terrestrial based transmitting site is available to deliver these messages they will be used. This practice "off-loads" the satellite network and improves system wide paging message through-put. In one preferred scanning technique, the paging receiver 126 operates to alternately scan for terrestrial and satellite signal. In another embodiment, all (or a portion) of known terrestrial signals could be first scanned, followed by the paging receiver's scanning of one or more satellite channels.

Of course, the automatic mode discussed above could be over-ridden in favor of a manual mode. To do this, the microcontroller 1126 receives instructions and commands from user controls 1128, which include conventional functions such as "read" and "lock" function selections, message acknowledge options, and other known user controls commonly employed on contemporary pagers. Additionally, one such user control (i.e., a Satellite/Terrestrial switch) may operate to force the microcontroller 1126 to control the switch 1102 such as to permanently select either the satellite based or the terrestrial based demodulating sections of the paging receiver 126. In this way, the paging customer (user) is given more control over how paging messages are received.

The automatic mode could also be over-ridden by instructions from the control station, which are incorporated into a paging message. This procedure may be preferably employed to re-route the delivery of paging messages to ease a congested paging traffic path or to accommodate the paging user when their preferred (specified) message delivery path has malfunctioned.

When the message is received, it is customary for the microcontroller 1126 to activate an alert circuit 1130, which may include silent alert, visual alert, or audible alert as is known in the art. Data messages may be displayed upon any suitable display means 1132, while tone, or tone-and-voice messages are presented to the user via a speaker 1134 (after amplification and filtering through audio circuits 1136). In this way, the paging receiver 126 of the present invention may receive paging messages directly from the satellite network or a terrestrial based ground station.

After reception of the paging message, the pager 126 activates (1137) an acknowledge transmitter 1138, which is coupled to the antenna 1100 by the antenna switch 1102 while in the acknowledge mode. According to the invention, the acknowledge transmitter 1138 preferably operates in the 1.5 GHz band to transmit appropriate acknowledge codes to the satellite network. Acknowledgements may be made to terrestrial based stations as well, if the system is so equiped. In this way, receipt of paging messages may be acknowledged by the paging receivers.

What is claimed is:

1. A paging communication system, comprising:
   satellite based communication means for communicating paging information to at least one of a plurality of selective call receivers;
   the plurality of selective call receivers, wherein the at least one of the plurality of selective call receivers receives the paging information from the satellite based communication means, and the at least one of the plurality of selective call receivers includes means for acknowledging receipt of the paging information via the satellite based communication means;
   control means for communicating with the satellite based communication means and for determining where to deliver the paging information and whether to await acknowledgment thereof and for determining operational parameters for delivery of the paging information to the at least one of the plurality of selective call receivers, wherein the control means operates responsive to the acknowledgment of the paging information to re-direct the paging information to another area.

2. The system of claim 1, wherein the satellite based communication means comprises a plurality of satellites arranged in a satellite network orbiting a celestial body.

3. The system of claim 1, wherein the satellite based communication means adapts at least a paging communication protocol in response to determination by the control means that the paging communication protocol is at least a portion of the operational parameters for delivery of the paging information.

4. The system of claim 1, wherein the satellite based communication means adapts at least a paging communication frequency in response to determination by the control means that the paging communication frequency is at least a portion of the operational parameters for delivery of the paging information.

5. The system of claim 1, wherein the control means includes a memory means for storing at least operational parameter information representing a preferred paging area for at least some of the plurality of selective call receivers operative in the system.

6. The system of claim 1, wherein the control means includes a memory means for storing at least operational parameter information representing a preferred paging frequency for at least some of the plurality of selective call receivers operative in the system.

7. The system of claim 1, wherein the control means includes a memory means for storing at least operational parameter information representing a preferred paging protocol for at least some of the plurality of selective call receivers operative in the system.

8. The system of claim 1, wherein the control means includes a memory means for storing at least operational parameter information representing a current location for at least some of the plurality of selective call receivers operative in the system.

9. The system of claim 1, wherein the control means determines where to deliver the paging information and operational parameters for delivery of the paging information to the at least one of the plurality of selective call receivers in accordance with operational parameter information stored within a memory means thereof.

10. The system of claim 1, which includes a terrestrial based communication means for communicating paging information received from the satellite based communication means to the at least one of the plurality of selective call receivers designated to receive the paging information.

11. The system of claim 10, wherein the terrestrial based communication means includes means for converting the paging information received from the satellite based communication means to accommodate the at least one of the plurality of selective call receivers designated to receive the paging information.

12. The system of claim 10, wherein the terrestrial based communication means is coupled to contemporary paging communication equipment.

13. The system of claim 10, wherein the plurality of selective call receivers operate to monitor the terrestrial based communication means and the satellite based communication means.

14. A paging communication system, comprising:
   satellite based communication means for communicating paging information to at least one of a plurality of selective call receivers;
   the plurality of selective call receivers, wherein the at least one of the plurality of selective call receivers receives the paging information from the satellite based communication means, and wherein the at least one of the plurality of selective call receivers includes means for generating an acknowledge signal to acknowledge receipt of the paging information via the satellite based communication means; and
   control means for determining where to deliver the paging information and operational parameters for delivery of the paging information to the at least one of the plurality of selective call receivers, the control means being operably responsive to the acknowledge signal to control transmitting power of the satellite based communication means.

15. A paging communication system, comprising:
   a plurality of terrestrial receivers, wherein at least one of the plurality of terrestrial receivers acknowledges receipt of paging information from at least one satellite or at least one terrestrial station;
   the at least one terrestrial station communicating the paging information with the at least one satellite;
   the at least one satellite communicating the paging information to at least one control station and the at least one terrestrial station, and further directly transmitting the paging information to the at least one of the plurality of terrestrial receivers; and
   the at least one control station determining where to deliver the paging information and whether to expect acknowledgment thereof, and determining operational parameters for delivery of the paging information to the at least one of the plurality of terrestrial receivers.

16. A method for providing a message to at least one selective call receiver in one or more areas on a celestial body, comprising the steps of:

at a control station:
(a) receiving the message;
(b) determining where to deliver and whether to expect acknowledgment of the message and determining operational parameters for delivery of the message;
(c) transmitting the message to at least one satellite orbiting the celestial body;
(d) receiving an information signal from the at least one satellite; and
(e) processing the information signal to determine the location of the at least one selective call receiver; at the at least one satellite:
(a) receiving the message from the control station;
(b) determining whether to transmit the message toward the celestial body or another satellite;
(c) transmitting the message in accordance with the determination of step (b);
(d) receiving an acknowledge signal; and
(e) informing the control station that the message was acknowledged by transmitting the information signal; and in the at least one selective call receiver:
(a) receiving the message; and
(b) acknowledging receipt of the message.

17. The method of claim 16, which includes at the at least one satellite the step of re-transmitting the message if an acknowledge signal is not received and the control station has determined to expect an acknowledge signal.

18. The method of claim 16, wherein at the at least one satellite the step of (c) transmitting further comprises transmitting the message toward the celestial body at high power when the at least one selective call receiver resides in a metropolitan area.

19. The method of claim 16, wherein at the at least one satellite the step of (c) transmitting further comprises transmitting the message toward the celestial body at low power when the at least one selective call receiver resides in a rural area.

* * * * *